US012508664B2

(12) United States Patent
Flueggen et al.

(10) Patent No.: US 12,508,664 B2
(45) Date of Patent: Dec. 30, 2025

(54) METHOD FOR PRODUCING A PLATE HEAT EXCHANGER AND PLATE HEAT EXCHANGER WITH THERMOCOUPLES OR MEASURING RESISTORS (71) Applicant: Linde Aktiengesellschaft, Munich (DE)

(72) Inventors: Rainer Flueggen, Bichl (DE); Pascal Freko, Eurasburg (DE); Konrad Braun, Lenggries (DE); Rainer Hoffmann, Unterhaching (DE); Stefan Gewald, Munich (DE); Janine Blank, Kienberg (DE)

(73) Assignee: Linde Aktiengesellschaft, Munich (DE)

( * ) Notice: Subject to any disclaimer, the term of this patent is extended or adjusted under 35 U.S.C. 154(b) by 1283 days.

(21) Appl. No.: 16/737,037

(22) Filed: Jan. 8, 2020

(65) Prior Publication Data
US 2020/0215634 A1    Jul. 9, 2020

(30) Foreign Application Priority Data
Jan. 8, 2019   (EP) ..................................... 19020007

(51) Int. Cl.
B23K 1/19       (2006.01)
B23K 1/00       (2006.01)
(Continued)

(52) U.S. Cl.
CPC .............. B23K 1/19 (2013.01); B23K 1/0012 (2013.01); B23K 2101/14 (2018.08);
(Continued)

(58) Field of Classification Search
None
See application file for complete search history.

(56) References Cited

U.S. PATENT DOCUMENTS 1,775,682 A  *  9/1930  Martin ............... G05D 23/1904
                                                 361/158
1,893,847 A  *  1/1933  Simpson ............ G05D 23/1931
                                                 361/158
(Continued)

FOREIGN PATENT DOCUMENTS

EP           3409354 B1    9/2021
JP         2002156194 A    5/2002
(Continued)

OTHER PUBLICATIONS

Rheat.com, "RTD-PT100", http://www.rheat.ae/product/rtd-pt100/, Nov. 15, 2018 (Year: 2018).*
(Continued)

Primary Examiner — Keith Walker
Assistant Examiner — Carlos J Gamino
(74) Attorney, Agent, or Firm — Millen, White, Zelano & Branigan P.C.; Ryan R. Pool (57) ABSTRACT The present invention concerns a method for producing a plate heat exchanger (1) with a multiplicity of parting sheets (20) and a multiplicity of fins (11, 12), a fin being respectively arranged between two neighboring parting sheets, wherein at least one capillary (30) with at least one thermocouple and/or measuring resistor element (40) is introduced into at least one parting sheet (20), and wherein in each case a parting plate of the multiplicity of parting plates and a fin of the multiplicity of fins are alternately arranged and are connected to one another in a material-bonding manner, and concerns a plate heat exchanger (1) produced in such a way.

4 Claims, 4 Drawing Sheets (51) Int. Cl.
*B23K 101/14* (2006.01)
*F28D 9/00* (2006.01)
*F28F 27/00* (2006.01)

(52) U.S. Cl.
CPC ............ *F28D 9/0062* (2013.01); *F28F 27/00* (2013.01); *F28F 2275/04* (2013.01)

(56) References Cited

U.S. PATENT DOCUMENTS

| | | | | |
|---|---|---|---|---|
| 3,830,622 | A * | 8/1974 | Hosoi | G05D 23/1931 432/12 |
| 2001/0047935 | A1* | 12/2001 | Enomoto | B23K 20/122 204/298.09 |
| 2003/0022008 | A1* | 1/2003 | Jogan | H01L 21/67109 428/137 |
| 2008/0116246 | A1* | 5/2008 | Rigal | F28D 9/0062 228/193 |
| 2011/0139392 | A1* | 6/2011 | Arzberger | B22D 2/006 164/151.4 |
| 2015/0241141 | A1* | 8/2015 | Fluggen | F28F 27/00 165/287 |
| 2018/0231258 | A1* | 8/2018 | Armstrong | F28D 7/024 |
| 2018/0290121 | A1 | 10/2018 | Takeuchi et al. | |
| 2019/0057851 | A1* | 2/2019 | Bhat | B23K 15/006 |
| 2021/0354223 | A1* | 11/2021 | Seiwert | F28D 9/0068 |
| 2021/0354224 | A1* | 11/2021 | Seiwert | F28F 21/083 |
| 2022/0082448 | A1* | 3/2022 | Belmekki | F25J 5/002 |

FOREIGN PATENT DOCUMENTS

| | | |
|---|---|---|
| JP | 2014169809 A * | 9/2014 |
| WO | WO2014056587 A1 | 4/2014 |
| WO | 2014096779 A1 | 6/2014 |

OTHER PUBLICATIONS

D8-Fraden, Jacob-Editor.: Handbook of modern sensors, Forth Edition Springer, 2010: ISBN-978-1-4419-6466-6 (pp. 1-633).

D7-Taylor-Editior: Plate-fin heat exchangers guide to their specification and use, 1st edition 1987 (pp. 1-137).

List of references cited on May 17, 2022 in an opposition against the corresponding granted European Patent EP3680599 (1 page).

* cited by examiner

METHOD FOR PRODUCING A PLATE HEAT EXCHANGER AND PLATE HEAT EXCHANGER WITH THERMOCOUPLES OR MEASURING RESISTORS

CROSS-REFERENCE TO RELATED APPLICATIONS

This application claims the benefit of EP Patent Application No. 19020007.1 filed on Jan. 8, 2019, the disclosure of which is herein incorporated by reference in its entirety.

The invention concerns a method for producing a plate heat exchanger and a plate heat exchanger with a multiplicity of parting sheets and a multiplicity of fins, a fin being respectively arranged between two neighboring parting sheets.

PRIOR ART

Plate heat exchangers have a multiplicity of parting sheets or separator plates arranged parallel to one another and a multiplicity of fins, a fin being arranged between every two neighboring parting sheets, so that a multiplicity of parallel channels that can be flowed through by a medium are formed between neighboring plates. To the sides, the fins are bounded by so-called sidebars, which are brazed to the adjacent plates. In this way, a multiplicity of parallel heat exchange passages are formed, so that media can for example be made to pass by one another counter-currently, in order to perform an indirect heat exchange.

Thermal stresses as a result of different thermal expansions caused by differential temperature differences may lead to the integrity of the seal between the heat exchange passages being mechanically degraded, to the extent that the plate heat exchanger leaks with respect to its surroundings. For analyzing the temperature field, such a plate heat exchanger may for example be provided with a temperature measurement on a surface of its outer skin. However, the temperatures on the outer skin only provide a local value with which the temperature inside the plate heat exchanger can be inferred by making assumptions. However, because the measuring takes place on the outer skin, these temperature measurements can be influenced by environmental influences.

WO 2014/056587 A1 describes for example a plate heat exchanger with an optical waveguide for temperature measurement. The optical waveguide is in this case arranged in an open groove, which is provided either in a fin or in a parting sheet of the plate heat exchanger.

It is desirable to provide an improved possibility for temperature measurement in plate heat exchangers.

DISCLOSURE OF THE INVENTION

Against this background, the invention proposes a method for producing a plate heat exchanger and a plate heat exchanger with a multiplicity of parting sheets and a multiplicity of fins, a fin being respectively arranged between two neighboring parting sheets, with the features of the independent patent claims. Advantageous configurations are the subject of the dependent claims and of the description which follows.

Within the scope of the present method for producing the plate heat exchanger, at least one capillary with at least one thermocouple and/or one measuring resistor element is introduced into at least one parting sheet of the multiplicity of parting sheets. A parting sheet of the multiplicity of parting sheets and a fin of the multiplicity of fins are respectively arranged alternately and connected to one another in a material-bonding manner. Consequently, a fin is respectively arranged between two parting sheets running parallel to one another.

The present invention is based on the acknowledged idea of introducing at least one thermocouple and/or one measuring resistor element in a capillary into at least one parting sheet of the plate heat exchanger and using it for monitoring the temperature within the plate heat exchanger, in particular already during its production.

In this context, a thermocouple should be understood as meaning in particular an element that uses the so-called thermoelectric effect or Seebeck effect for measuring a temperature. In particular, a thermocouple comprises two electrical conductors of different metals that are connected to one another at one end, for example by means of a welded connection. The thermoelectric effect or Seebeck effect refers to the occurrence of an electrical voltage or a potential difference (so-called thermoelectric voltage) on account of a temperature gradient along an electrical conductor. This electrical voltage or potential difference varies, in particular dependent on the temperature difference along the conductor and also in particular for each conductor material. Consequently, when there is a temperature difference in the two conductors produced from different materials, different thermoelectric voltages are generated in the thermocouple. The connecting point at which the two conductors of the thermocouple are connected to one another at their one end is expediently exposed to the temperature to be measured, and is also referred to as the measuring point. At its other ends that are not connected to one another (so-called comparison point), the two conductors are connected in particular to a voltmeter. The temperature at the measuring point can be inferred from the voltage difference ascertainable at these ends or at this comparison point.

Alternatively (but in principle also in addition), at least one measuring resistor element in a capillary may be introduced into at least one parting sheet of the plate heat exchanger and used for monitoring the temperature within the plate heat exchanger, in particular already during its production. Measuring resistor elements are known per se and are also referred to as temperature-dependent resistors or resistance thermometers. They are electrical components that use the temperature dependence of the electrical resistance of an electrical conductor for measuring the temperature. Pure metals are generally used as electrical conductors, but in particular corrosion-resistant platinum. Also of advantage here is the virtually linear relationship between temperature and resistance. Platinum resistance thermometers of appropriate configurations can be used up to 1000° C. There are known standardized platinum measuring resistors such as Pt100 or Pt1000, in the case of which the nominal resistance R0 at 0° C. is 100 Ohms and 1 kOhm, respectively. For resistance measurement, in the simplest case the voltage drop across the measuring resistor flowed through by a constant measuring current is measured, with a Wheatstone bridge in a two-conductor circuit usually being used for this. In order to avoid the influence on the measured value of long leads to the sensor, three- or four-conductor circuits are known. In this way, much greater accuracies can be achieved, in particular independently of the material used for the connection cable, while at the same time there is a correspondingly greater space requirement.

Thermocouples and measuring resistor elements have a great heat resistance, and make it possible to record precise measured values even at high temperatures. Therefore, thermocouples and measuring resistor elements are particularly suitable for being used already during the production process of the plate heat exchanger, since they withstand the high temperatures occurring during the material-bonding connection and at the same time allow temperature values or measured temperature values to be recorded precisely. In particular, thermocouples and measuring resistor elements are much more heat-resistant than conventional optical waveguides. Therefore, conventional optical waveguides usually cannot be used during the production process of a plate heat exchanger, since they would not withstand the high temperatures thereby occurring. Although there is the possibility of using high-temperature-resistant optical waveguides that can be exposed to such high temperatures, such high-temperature-resistant optical waveguides are very cost-intensive. By contrast with this, with the aid of thermocouples or measuring resistor elements, temperature recording or temperature monitoring can be made possible in a much more favorable way, not only during operation but also during the production process of the plate heat exchanger.

In particular, a multiplicity of thermocouples or measuring resistor elements are arranged for each capillary. The capillary formed in such a way is referred to hereinafter as a "thermocouple profile bar" or as a "measuring resistor element profile bar". These thermocouples or measuring resistor elements in the capillary are expediently arranged at suitable distances from one another, in order to be able to effectively record the temperature within the plate heat exchanger at the corresponding points along the profile bar, that is to say along the longitudinal extent of the capillary, in particular in order to be able to record temperature differences or a temperature distribution or a temperature field. Furthermore, such a capillary is in particular respectively arranged in a multiplicity of parting sheets, in particular in at least 10%, preferably at least 20%, 25%, 30%, 40% or at least 50% of the parting sheets. In particular, the parting sheets with capillaries are arranged at suitable distances from one another, in order to effectively record the temperature within the plate heat exchanger and in order furthermore to be able in particular to record temperature differences or a temperature distribution or a temperature field. In particular, it can in this way be made possible to record temperature profiles in the plate heat exchanger in a small installation space.

The specific types of thermocouples or measuring resistor elements in the capillary may be chosen in particular according to the specific properties of these types, and furthermore in particular in dependence on the conditions in the respective plate heat exchanger. Thermocouple types expediently describe the combination of materials of the two conductors used in the respective thermocouple. For example, within the scope of the present method, thermocouples of the type K (with one conductor of NiCr and the other of Ni) and/or of the type J (with conductors of Fe and CuNi) and/or of the type L (with conductors of Fe and CuNi) can be used. Measuring resistor elements are preferably Pt100 or Pt1000 measuring resistors, with two-, three- or four-conductor circuits being used according to accuracy requirements and space restrictions.

Preferably, temperature values are recorded during the material-bonding connection in the production of the plate heat exchanger with the aid of the at least one thermocouple or measuring resistor element of the at least one capillary, and the material-bonding connection is monitored on the basis of or in dependence on the recorded temperature values. On account of its great heat resistance, with the aid of the at least one thermocouple or measuring resistor element the temperature within the plate heat exchanger can be precisely recorded and monitored during its production process or during the material-bonding connection of the parting sheets and the fins. By contrast with optical waveguides, with the aid of thermocouples or measuring resistor elements temperature recording and temperature monitoring can be easily made possible, even during the production process of the plate heat exchanger. In particular, the process of the material-bonding connection can be carried out or controlled in an open-loop and/or closed-loop manner in dependence on the recorded temperature values. For example, it may be monitored in dependence on the recorded temperature values whether the parting sheets or fins have been heated to a sufficiently high level in the course of the connecting process in order to achieve a desired strength of the connection, and/or whether temperature gradients that could endanger the durability or strength of the connection occur during the connecting process.

Advantageously, the parting sheets and the fins are respectively connected to one another in a material-bonding manner by means of a brazing process, preferably by means of a vacuum brazing process. For example, for this purpose a braze may be applied to the surfaces of the parting sheets and subsequently the parting sheets and the fins may be stacked alternately one on top of the other, with the sidebars arranged closing off the sides. Subsequently, the plate heat exchanger or its central body is brazed by heating in a furnace. In such brazing, an uneven temperature distribution may be produced within the plate heat exchanger during the heating up or cooling down. On account of the different thermal expansions and the resultant differences in deformation, this may lead to the formation of gaps within the plate heat exchanger due to loose or not yet sufficiently firmly connected fins and parting sheets. Particularly preferably, temperature values are therefore recorded during the brazing process with the aid of the at least one thermocouple or measuring resistor element in the at least one capillary, and the brazing is monitored on the basis of the recorded temperature values and is also controlled in an open-loop or closed-loop manner, preferably in dependence on the recorded temperature values. The effortless and precise recording of the temperature values with the aid of the thermocouples or measuring resistor elements therefore allows the temperature distribution and also in particular a temperature field or temperature differences within the plate heat exchanger to be determined and monitored during the brazing. In particular, it can in this way be monitored and prevented that gaps form in the plate heat exchanger on account of different thermal expansions.

Advantageously, the at least one capillary is introduced into a groove in the at least one parting sheet. This groove may in particular be provided in an interior of the parting sheet in such a way that the capillary is expediently completely enclosed or covered by the material of the parting sheet. In particular, the groove may be introduced into the at least one parting sheet, for example by means of milling, in the course of the production process of the plate heat exchanger. Subsequently, the capillary may expediently be introduced into the groove produced. It is similarly conceivable that the at least one parting sheet already has the corresponding groove when it is obtained from a corresponding manufacturer, and it is just the capillary that is introduced into the groove in the course of the production process.

Preferably, the at least one parting sheet that has the capillary with the at least one thermocouple or measuring resistor element is formed from a first part-sheet and a second part-sheet with surfaces adjacent to one another. Parting sheets, that is to say parting sheets such as are used elsewhere in the production of the plate heat exchanger, may be used here in particular as part-sheets. Then, two parting sheets are used instead of one, and the capillary is arranged there.

In particular, the groove is preferably introduced into at least one of the two adjacent surfaces facing one another of the first and second part-sheets. The groove may for example be produced by milling. Either the groove is introduced only into one part-sheet or in particular is introduced in equal parts (two "half-grooves") into both surfaces of the part-streets that are adjacent to one another.

In particular, the capillary is in this case introduced into the groove in such a way that it is completely enclosed or covered by the material of the first part-sheet and the second part-sheet. By analogy with the above explanation, the grooves may be introduced into the part-sheets, in particular in the course of the production process of the plate heat exchanger, for example by milling, or expediently part-sheets already provided with grooves may also be obtained. In this case, the part-sheets may on the other hand also be different from the parting sheets in which no capillaries have been introduced, and for example only be half as thick as these parting sheets. It is particularly preferably conceivable that one of the parting sheets of the plate heat exchanger in which otherwise no capillary is inserted is respectively used as the first and second parting sheets. In the course of the production process of the plate heat exchanger, a half-groove may in this case be respectively introduced in particular into two such parting sheets, for example by milling. Once the corresponding surfaces of the parting sheets have been placed one on top of the other, the corresponding capillary may be introduced into the complete groove thus produced, and the two parting sheets may then be connected to one another in a material-bonding manner, for example by brazing or welding.

Preferably, outside the at least one parting sheet, the at least one capillary is encapsulated in metal or is formed as a metal capsule or is encased in a suitable metal. In particular, the capillary consequently has a first sub-region or portion inside the parting sheet and a second sub-region or portion outside the parting sheet. Alternatively or in addition, inside the at least one parting sheet, the at least one capillary is preferably formed with a thin wall. Consequently, in particular in its first sub-region, the capillary is not encapsulated in metal.

Preferably, the at least one capillary is brought out from a process chamber in which the material-bonding connection is carried out, in particular from a (vacuum) furnace for brazing. In particular as a result of the metal encapsulation in said second sub-region outside the parting sheet, it can consequently be prevented that vapor emissions are given off into the process chamber or the furnace space during the connecting process.

It goes without saying that the production process of the plate heat exchanger may also comprise further expedient steps before the plate heat exchanger can be put into operation, for example the fins may be bounded on both sides by so-called sidebars, which are connected to the adjacent parting sheets in a material-bonding manner, for example by brazing. Expediently produced in this way are a multiplicity of parallel heat exchange passages, through which two fluids or media can be passed during regular operation of the plate heat exchanger for indirect heat exchange. Particularly advantageously, the at least one capillary with the at least one thermocouple or measuring resistor element is not removed from the at least one parting sheet in the later course of the production process, or even after the production process has been completely carried out. The at least one capillary with the at least one thermocouple or measuring resistor element consequently remains in the plate heat exchanger even after the production process, and can expediently be used during the regular operation of the same.

If a capillary with the at least one thermocouple or measuring resistor element has been placed into a groove during the brazing process, during the brazing this capillary is enclosed by the braze and can no longer be removed thereafter (for example for the case of repairs or the like). In order to avoid this, a larger capillary, for example of stainless steel or some other material with a much higher melting point than aluminum, would have to be placed into the groove. The interior space of this larger capillary remains braze-free, so that a temperature measuring device with a measuring element can be inserted and removed again. The same procedure is also necessary if the temperature measuring device is not intended to be in the plate heat exchanger during the brazing process. If there were then just an empty groove, it would be filled with braze. Here, too, it is consequently necessary for brazing to include the creation of a larger capillary, which then keeps the space free for the temperature measuring device. A thermally stable stainless steel tube with the smallest possible wall thickness (for example 0.2 mm) may be used for example for this, in order to ensure the required cross section.

A particularly preferred embodiment of the invention concerns a method for operating a plate heat exchanger that has been produced according to a preferred embodiment of the method according to the invention. In the course of this operation, a first fluid and a second fluid are passed through the plate heat exchanger, in particular through the heat exchange passages that are formed by the interconnected fins and parting sheets, bounded at the sides by the sidebars. Expediently, these two fluids are made to pass by one another counter-currently, and can in particular perform an indirect heat exchange. During this operation of the plate heat exchanger, particularly advantageously temperature values are recorded with the aid of the at least one thermocouple or measuring resistor element in the at least one capillary. It is in this way made possible to carry out temperature recording during the material-bonding connecting process of the fins and the parting sheets and furthermore during the regular operation of the plate heat exchanger with the same temperature measuring devices in the form of the at least one thermocouple or measuring resistor element, that is to say in particular by means of one or more of the thermocouple or measuring resistor element profile bars defined above. The thermocouples or measuring resistor elements that are used in the course of the production process for monitoring the material-bonding connecting process, preferably the brazing or vacuum brazing, can consequently also still continue to be used in the regular operation of the plate heat exchanger in order to record temperature values, in particular in order to determine temperature differences or a temperature distribution or a temperature field within the plate heat exchanger. In particular, it is consequently not necessary to provide additional temperature measuring devices for regular operation, whereby costs and effort can be saved.

According to a preferred embodiment, the operation of the plate heat exchanger is controlled in an open-loop and/or closed-loop manner in dependence on the temperature values recorded during the operation of the plate heat exchanger. In particular, the currently recorded temperature values can consequently be used to allow effective, best-possible operation of the plate heat exchanger. Furthermore, the recorded temperature values are used in particular to perform an optimization of the operation or the operating mode of the plate heat exchanger, expediently also to be able to prolong the remaining lifetime of the plate heat exchanger.

Advantageously, a lifetime consumption and/or a remaining lifetime of the plate heat exchanger is/are determined in dependence on the temperature values recorded during the operation of the plate heat exchanger. For this purpose, the currently recorded temperature values are evaluated, and in this case may for example be compared with stored data or temperature values recorded at earlier times and/or for example be used as input data for a theoretical model or a simulation of the plate heat exchanger. By means of the thermocouples or measuring resistor elements arranged within the plate heat exchanger, consequently temperature values in the interior of the plate heat exchanger can be recorded, which allows particularly effective and effortless monitoring of the lifetime. In particular, the temperature values can be used to derive thermal or mechanical stresses within the plate heat exchanger, in dependence on which the lifetime consumption and/or the remaining lifetime of the plate heat exchanger can be expediently determined. Furthermore, the currently recorded temperature values may expediently also be archived and for example stored in a control unit, in order to be used for a comparison with temperature values recorded at a later time, and consequently for a future determination of the lifetime consumption and/or the remaining lifetime.

Preferably, an operating history of the plate heat exchanger is determined in dependence on the temperature values recorded during the operation of the plate heat exchanger. The operating history should be understood in this context as meaning in particular processes, changes in a process or circumstances in the plate heat exchanger that have an effect on the lifetime consumption or on the remaining lifetime of the plate heat exchanger. In particular, the operating history of the plate heat exchanger concerns load changes carried out, that is to say in particular processes in the course of which the mechanical stresses occurring in the plate heat exchanger change. In particular, a number of load changes carried out and/or a rate at which individual load changes are carried out are determined in dependence on the temperature values recorded during the operation of the plate heat exchanger as the operating history.

A plate heat exchanger according to the invention has a multiplicity of parting sheets and a multiplicity of fins, a fin of the multiplicity of fins being respectively arranged between two neighboring parting sheets of the multiplicity of parting sheets, at least one capillary with at least one thermocouple and/or measuring resistor element having been introduced into at least one of the parting sheets. Advantages and preferred configurations of the method according to the invention and of the plate heat exchanger according to the invention are evident in an analogous way from the present description.

In the case of a plate heat exchanger according to the invention, the at least one parting sheet is preferably formed from a first part-sheet and a second part-sheet with surfaces adjacent to one another, a groove having been introduced into at least one of the two adjacent surfaces of the first and second part-sheets and the at least one capillary being arranged in the groove.

A plate heat exchanger according to the invention is produced in particular according to a preferred embodiment of the method according to the invention.

Furthermore, the plate heat exchanger is preferably designed for the purpose of being operated according to a preferred embodiment of the method according to the invention as explained above. In particular, a control unit may be provided for this purpose, for example in the form of a stored-program controller (SPC), which is designed, in particular in terms of programming, to carry out a preferred embodiment of a method according to the invention. In particular, this control unit may receive, and expediently store and/or evaluate, the temperature values recorded during the operation of the plate heat exchanger with the aid of the at least one thermocouple or measuring resistor element of the at least one capillary, in particular in order to control the plate heat exchanger correspondingly in an open-loop and/or closed-loop manner and/or in order determine the lifetime consumption or the remaining lifetime and/or in order to determine the operating history.

Further advantages and configurations of the invention will emerge from the description and the appended drawing.

Further possible configurations of the invention also comprise combinations of features described above or below with regard to the exemplary embodiments that have not been specified explicitly. A person skilled in the art will in this case also add individual aspects described here as improvements or additions to the respective basic embodiments of the plate heat exchanger according to the invention or the method according to the invention.

The invention is schematically illustrated in the drawing on the basis of exemplary embodiments and will be described below with reference to the drawing.

EMBODIMENT(S) OF THE INVENTION

Figure 1A:
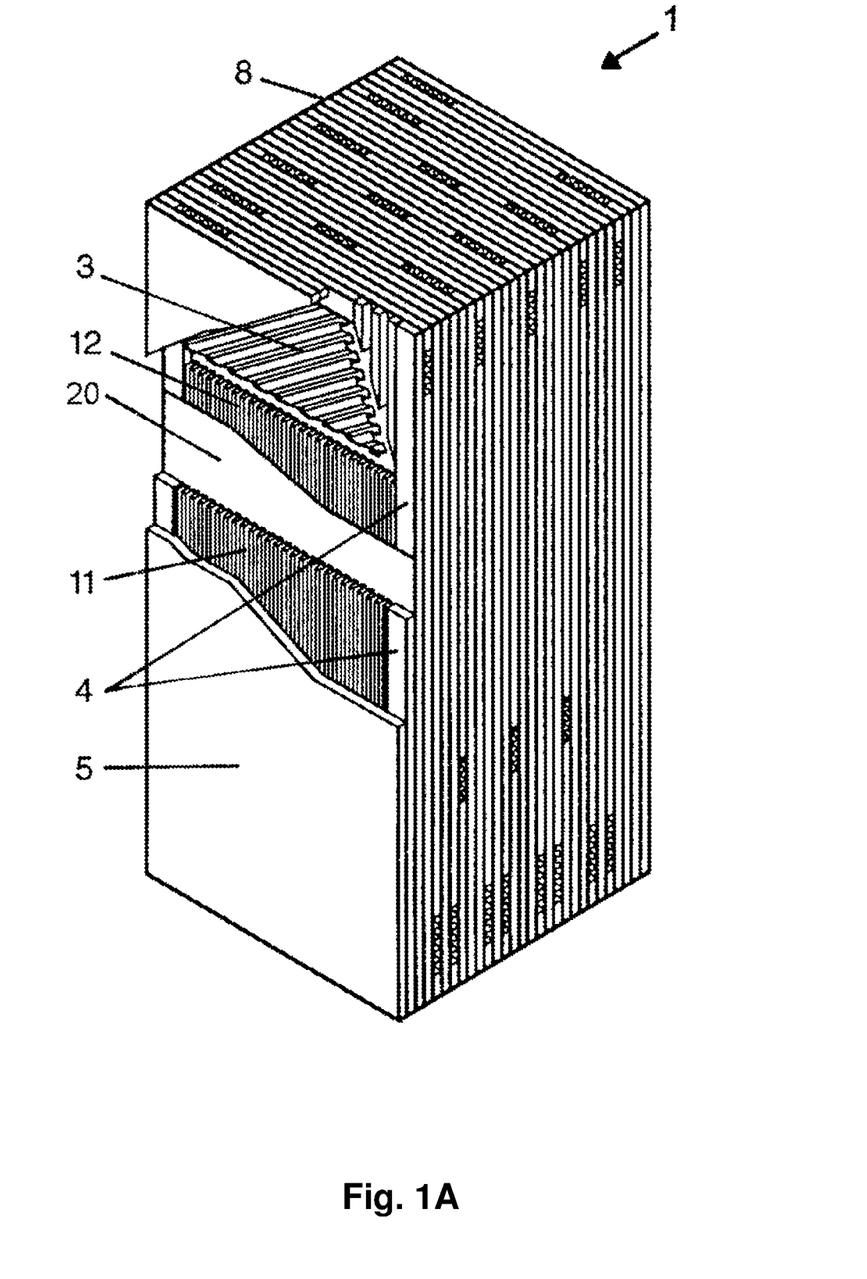
FIG. 1A schematically and perspectively shows a preferred configuration of a plate heat exchanger according to the invention before the mounting of inlet and outlet attachments.
Figure 1B:
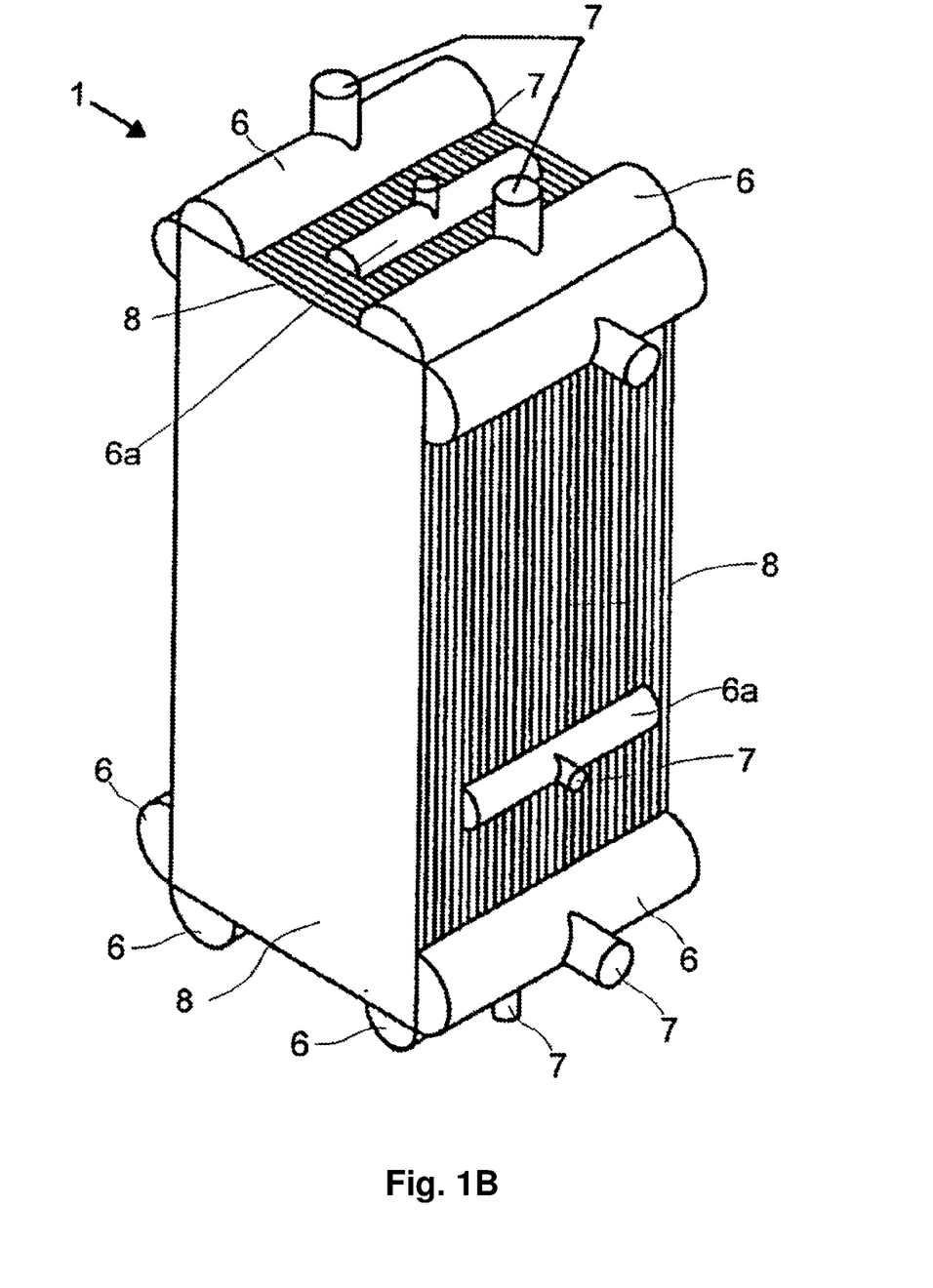
FIG. 1B schematically and perspectively shows a preferred configuration of a plate heat exchanger according to the invention after the mounting of the inlet and outlet attachments, which have been produced and can be operated according to a preferred embodiment of a method according to the invention.

In FIG. 1, a preferred configuration of a plate heat exchanger according to the invention is illustrated schematically and perspectively and is denoted by 1.

The plate heat exchanger 1 according to FIG. 1A has a cuboidal central body 8 with a length of for example several meters and a width and height of for example approximately one meter or a few meters. The central body 8 is essentially an arrangement of alternating parting sheets 20 and fins 11, 12. The central body 8 of the plate heat exchanger 1 therefore has a multiplicity of parting sheets and a multiplicity of fins, a fin being respectively arranged between two neighboring parting sheets. Both the parting sheets and the fins may for example be produced from aluminum. To their sides, the fins 11, 12 are closed off by sidebars 4, which may likewise be produced from aluminum, so that, as a result of the stacked construction with the parting sheets 20, a side wall is formed. The outer fins (here 11) of the central body 8 are closed off by a covering 5 (outer sheet), lying parallel to the fins and the parting sheets and generally likewise of aluminum.

For producing the plate heat exchanger 1, the generally braze-clad parting sheets 20, sidebars 4 and fins (here only the fins 11 and 12 are denoted) are placed one on top of the other in a stack to form the central body 8 illustrated here, which is then brazed under a vacuum in a brazing furnace. Subsequently, the inlet and outlet attachments 6, 6a required for letting the heat-exchanging fluids in and out are mounted, as shown in FIG. 1B.

In FIG. 1B, attachments 6 and 6a can be seen on top of the central body 8, at its sides and under the central body 8. The attachments 6 and 6a that are located underneath the central body 8 and on the side facing away from the side depicted are partially concealed.

A fluid or process flow can be fed to the plate heat exchanger 1 and removed again from it through nozzles 7. The attachments 6 and 6a serve for distributing the fluid introduced through the nozzles 7 and for collecting and concentrating the fluid to be removed from the plate heat exchanger 1, the distributing and collecting taking place by way of distributor fins 3 (cf. FIG. 1A) to and from the heat exchanger fins 11, 12. Within the plate heat exchanger 1, the various flows of fluid then exchange thermal energy.

The plate heat exchanger 1 shown in FIG. 1 is designed to make flows of fluid pass by one another in separate passages for heat exchange. Some of the flows can be made to pass by one another counter-currently, others cross-currently or concurrently.

At least one capillary with at least one thermocouple or a measuring resistor element has been introduced into at least one parting sheet 20 of the multiplicity of parting sheets, as explained below with reference to FIG. 2, which schematically and perspectively shows a detail of the plate heat exchanger 1.

Figure 2:
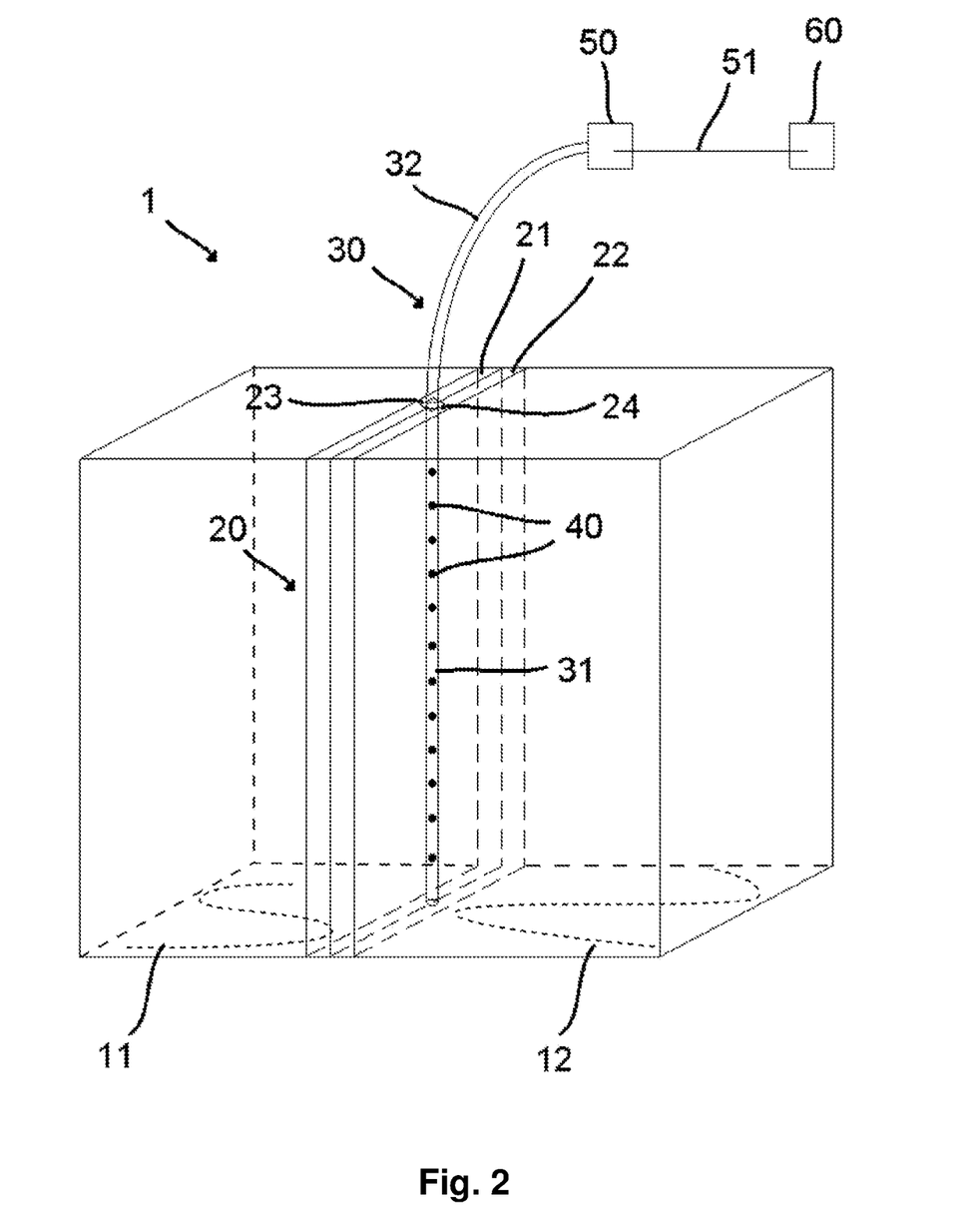
FIG. 2 schematically shows a detail of a preferred configuration of a plate heat exchanger according to the invention.

As can be seen in FIG. 2, fins 11 and 12 are arranged alongside a parting sheet 20. The fins 11 and 12 are only illustrated very schematically, in that the path they follow on the lower surface of the detail illustrated here is indicated. The channels formed by the fins 11 and 12 extend parallel to the portion 31, which is described below. The parting sheet 20 comprises two part-sheets 21 and 22, into which a groove 23 or 24 has respectively been introduced. In these (half-) grooves 23 and 24, a capillary 30 has been introduced into the parting sheet 20, in particular in such a way that the capillary 30 is completely enclosed or covered by the material of the first part-sheet 21 and the second part-sheet 22. It is also possible to introduce only one groove into only one of the part-sheets 21, 22, into which the capillary is then inserted. Customary parting sheets or separator plates may be used for example as part-sheets 21, 22. In particular, the capillary 30 has in this case a first portion 31 inside the parting sheet 20 and a second portion 32 outside the parting sheet 20. In the first portion 31 inside the parting sheet 20, arranged in the capillary 30 are a multiplicity of mutually spaced-apart thermocouples or measuring resistor elements 40 ("thermocouple or measuring resistor element profile bar"), by means of which temperature values can be recorded along the longitudinal direction of the capillary 30 within the plate heat exchanger 1. The capillary 30 is designed in particular with a thin wall in the first portion 31, or as a thin stainless steel tube, and is encapsulated in metal in the second portion 32, that is to say is encased by means of a metal or is formed as a thicker tube.

Outside the parting sheet 20, the capillary 30 is brought to a transfer point 50, which may be connected by way of a cabling 51 to a computing unit 60, for example a control unit. In particular, the computing unit 60 may receive and evaluate the temperature values recorded by the thermocouples or measuring resistor elements 40 and send the result data from there, for example by means of a transmitter, to a cloud for further processing. The transfer point 50 may for example take the form of an interface between a process chamber, in which the plate heat exchanger 1 is located, and the outside world, so that in particular the computing unit 60 does not have to be arranged within the process chamber. For example, this process chamber may be a furnace or brazing furnace during a production process of the plate heat exchanger 1 or a coldbox during the regular operation of the plate heat exchanger 1.

If the measuring elements are thermocouples, the cabling must be continued in the region 51 optimally with the same material as in the region 32. Otherwise, the unit 60 cannot correctly measure the thermoelectric voltage, unless the temperature at the transfer point 50 were also measured and the thermoelectric voltage corrected correspondingly. If measuring resistor elements are used, such line connection problems can be avoided.

The plate heat exchanger 1 is produced and operated in particular according to a preferred embodiment of a method according to the invention, as explained below with reference to FIG. 3, in which a preferred embodiment of a method according to the invention is illustrated schematically as a block diagram.

A production process of the plate heat exchanger 1 is in this case denoted by 100. In the course of the production process 100, firstly, in a step 101, a multiplicity of parting sheets and a multiplicity of fins are provided.

The parting sheets correspond for example to the part-sheets 21 and 22 illustrated in FIG. 2, but in each case do not have a groove. In step 102, a groove is milled into some of the parting sheets, in order to obtain part-sheets 21 and 22 such as are illustrated in FIG. 2. For example, a groove may be respectively introduced into 25% of the multiplicity of parting sheets.

In step 103, a capillary 30 is respectively introduced in each case between two of the sheets 21, 22 provided in step 102 with grooves, in order to obtain in each case a parting sheet 20 with a capillary 30, as it is shown in FIG. 2. In this example, parting sheets 20 with a capillary 30 are therefore twice as thick as parting sheets without a capillary, since the parting sheets 20 with a capillary 30 are each produced from two such parting plates without a capillary.

In step 104, a braze is applied to the surfaces of the parting sheets in a process chamber, for example a furnace, and subsequently the parting sheets and fins are stacked alternately one on top of the other. For example, in this case every fourth parting sheet may be a parting sheet 20 with a capillary 30, so that here the parting sheets (part-sheets) adjacent to one another must be connected by brazing. After the stacking, in step 105 the individual capillaries 30 are respectively connected to a computing unit by way of a transfer point and in step 106 the parting sheets and the fins are connected to one another in a material-bonding manner in the furnace by means of brazing.

During the brazing, in step 107 temperature values within the plate heat exchanger are recorded with the aid of the thermocouples or measuring resistor elements 40 in the capillaries 30 and are transmitted to the computing unit. In step 108, the further brazing process is monitored on the basis of or in dependence on the recorded temperature values. In particular, in this case a temperature distribution in the plate heat exchanger is monitored, expediently in order to prevent the formation of gaps within the plate heat exchanger on account of different thermal expansions during the brazing operation and resultant differences in deformation due to loose or not yet sufficiently firmly connected parting sheets and fins.

When the fins and parting sheets or the part-sheets have been successfully connected to one another, in step 109 the attachments 6, 6a, nozzles 7 and covering are mounted on the plate heat exchanger 1. When the plate heat exchanger 1 has been successfully produced, the capillaries 30 can be separated from the computing unit 60 in step 110.

Even after the production process has been successfully performed, the capillaries 30 remain within the plate heat exchanger 1 and the thermocouples or measuring resistor elements 40 can also be used for recording temperature values during regular operation, as explained below.

Figure 3:
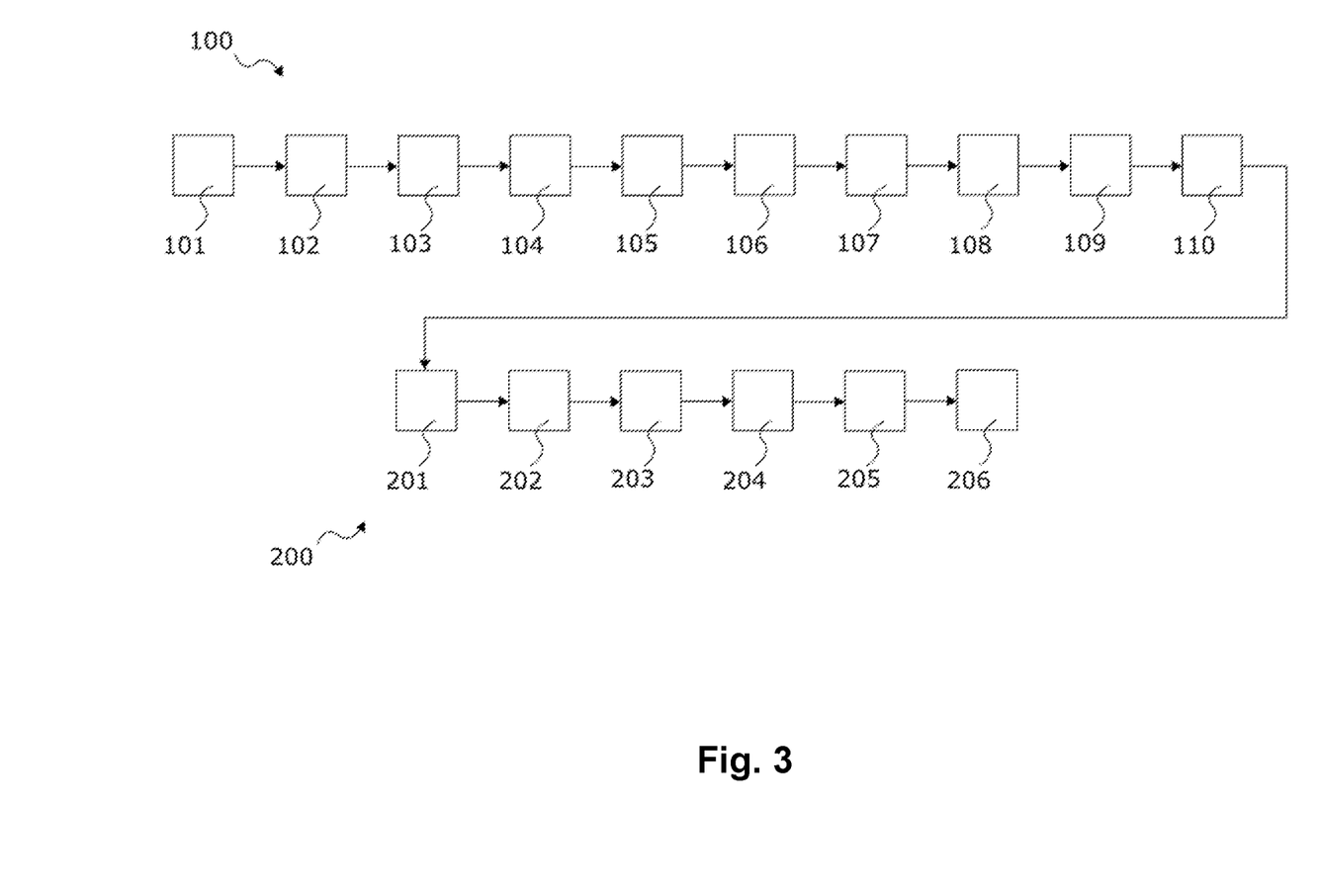
FIG. 3 schematically shows a preferred embodiment of a method according to the invention as a block diagram.

Regular operation of the plate heat exchanger 1 is denoted in FIG. 3 by 200. In step 201, the capillaries 30 are once again connected to a computing unit, for example to a control unit. In step 202, two fluids are made to pass counter-currently through the plate heat exchanger 1, in order to perform an indirect heat exchange.

In step 203, during this operation of the plate heat exchanger, temperature values are recorded with the aid of the thermocouples or measuring resistor elements 40 in the capillaries 30. In step 204, the operation of the plate heat exchanger 1 is controlled in an open-loop or closed-loop manner in dependence on these recorded temperature values. In particular, in this case an optimization of the operation may be carried out, in order to be able to prolong the remaining lifetime of the plate heat exchanger 1.

Furthermore, in step 205 a lifetime consumption or a remaining lifetime of the plate heat exchanger 1 is determined in dependence on the recorded temperature values. For example, the temperature values can be used to determine thermal or mechanical stresses within the plate heat exchanger 1, in dependence on which the lifetime consumption and the remaining lifetime of the plate heat exchanger 1 can be determined.

In step 206, the recorded temperature values are expediently archived in the computing unit, in order to be available for a comparison with temperature values recorded at a later time.

It is consequently made possible by the present invention to carry out a temperature recording in the course of the production process of the plate heat exchanger 1, during the brazing of the fins and the parting sheets, and also in the course of the regular operation of the plate heat exchanger 1 with the same temperature measuring devices in the form of the thermocouples or measuring resistor elements 40 in capillaries 30. The thermocouples or measuring resistor elements 40 that are used in the course of the production process for monitoring the brazing can also continue to be used in regular operation.

LIST OF REFERENCE SIGNS

1 Plate heat exchanger
3 Distributor fins
4 Sidebars
5 Covering
6 Attachment
6a Attachment
7 Nozzles
8 Central body
11 Fin
12 Fin
20 Parting sheet
21 Part-sheet
22 Part-sheet
23 Groove
24 Groove
30 Capillary
31 First portion of the capillary
32 Second portion of the capillary
40 Thermocouple or measuring resistor element
50 Transfer point
51 Line
60 Computing unit
100 Production process
101 to 110 Method steps
200 Regular operation
201 to 206 Method steps

The invention claimed is:

1. A method for producing a plate heat exchanger with a multiplicity of parting sheets and a multiplicity of fins, a fin being respectively arranged between two neighboring parting sheets, said method comprising:
   introducing at least one capillary with at least one thermocouple and/or measuring resistor element into at least one parting sheet of the multiplicity of parting sheets, and
   arranging and connecting the multiplicity of parting sheets and multiplicity of fins so that in each case a parting sheet and a fin are alternately arranged and are connected to one another in a material-bonding manner,
   wherein said at least one parting sheet is formed from a first part-sheet and a second part-sheet wherein a surface of the first-part sheet is adjacent to and faces a surface of the second-part sheet, and
   wherein the at least one capillary is introduced into a groove formed in both of the two adjacent surfaces facing one another of the first and second part-sheets.

2. The method according to claim 1, wherein the parting sheets and the fins are respectively connected to one another in said material-bonding manner by a brazing process.

3. The method according to claim 1, wherein the at least one capillary is formed with a first portion, lying inside the at least one parting sheet, and/or wherein a second portion of the at least one capillary lies outside the at least one parting sheet and is encapsulated in metal in.

4. The method according to claim 1, wherein the parting sheets and the fins are respectively connected to one another in said material-bonding manner by a vacuum brazing process.

* * * * *